US012605960B1

(12) United States Patent
Tetmeyer et al.

(10) Patent No.: US 12,605,960 B1
(45) Date of Patent: Apr. 21, 2026

(54) METHOD FOR MANUFACTURING A DEEP AERODYNAMIC BICYCLE WHEEL

(71) Applicant: Hed Cycling Products, Inc., Roseville, MN (US)

(72) Inventors: Andrew Lawrence Tetmeyer, St. Paul, MN (US); Anne Marie Hed, North Oaks, MN (US)

(73) Assignee: HED CYCLING PRODUCTS, INC., Roseville, MN (US)

( * ) Notice: Subject to any disclaimer, the term of this patent is extended or adjusted under 35 U.S.C. 154(b) by 249 days.

(21) Appl. No.: 18/468,575

(22) Filed: Sep. 15, 2023

Related U.S. Application Data

(60) Provisional application No. 63/414,382, filed on Oct. 7, 2022.

(51) Int. Cl.
*B60B 1/04* (2006.01)
*B60B 7/00* (2006.01)
(Continued)

(52) U.S. Cl.
CPC .............. *B60B 1/041* (2013.01); *B60B 1/042* (2013.01); *B60B 1/046* (2013.01); *B60B 7/0006* (2013.01);
(Continued)

(58) Field of Classification Search
CPC ......... Y10T 29/49515; Y10T 29/49497; B60B 1/041; B60B 1/042; B60B 1/046;
(Continued)

(56) References Cited

U.S. PATENT DOCUMENTS

| 339,550 A | 4/1886 | Hudson |
| 362,472 A | 5/1887 | Warwick |
| (Continued) | | |

FOREIGN PATENT DOCUMENTS

| DE | 30 16 862 A1 | 11/1981 |
| DE | 102014002764 A1 | 9/2014 |
| (Continued) | | |

OTHER PUBLICATIONS

"Specialized Bicycle Components Accessory Catalog, 1990," Hed Design, White Bear Lake, MN, US, (1989 Product Price List), 17 pgs.

(Continued)

*Primary Examiner* — Jermie E Cozart
(74) *Attorney, Agent, or Firm* — Sprinkle IP Law Group

(57) ABSTRACT

The present disclosure provides a method for manufacturing a bicycle wheel. A fairing is positioned relative to a base rim that comprises a plurality of anchor holes. A hub is positioned in the central opening and a plurality of spokes inserted into the hub. A spoke is fed from a first side of the fairing to a second side of the fairing through a respective spoke access opening in the fairing. The fairing is pulled back from the base rim to provide a work opening and the spoke manipulated from the second side of the fairing via the work opening to guide the first spoke to a respective anchor opening in the base rim. The spoke is attached to the base rim using a respective spoke nipple. The outer portion of the fairing is bonded to the base rim to create a deep aerodynamic rim.

16 Claims, 10 Drawing Sheets

(51) Int. Cl.
 *B60B 3/12* (2006.01)
 *B60B 21/06* (2006.01)

(52) U.S. Cl.
 CPC ............... *B60B 3/12* (2013.01); *B60B 21/062*
  (2013.01); *B60B 2310/318* (2013.01); *B60B*
  *2320/124* (2013.01); *B60B 2900/1216*
  (2013.01); *Y10T 29/49497* (2015.01); *Y10T*
  *29/49515* (2015.01)

(58) Field of Classification Search
 CPC ......... B60B 1/062; B60B 3/12; B60B 7/0006;
  B60B 2310/318; B60B 2320/124; B60B
  2900/1216
 See application file for complete search history.

(56) References Cited

U.S. PATENT DOCUMENTS

| | | | |
|---|---|---|---|
| 365,091 A | 6/1887 | Owen | |
| 382,658 A | 5/1888 | Nickerson | |
| 436,993 A | 9/1890 | Overman | |
| 697,118 A | 4/1902 | Van Horn | |
| 810,860 A | 1/1906 | Heart | |
| 1,968,005 A | 7/1934 | Swain | |
| 1,969,088 A | 8/1934 | Maranville | |
| 2,938,738 A | 5/1960 | Borup | |
| 3,452,798 A | 7/1969 | Ravreby | |
| 3,656,531 A | 4/1972 | Ross | |
| 3,862,779 A | 1/1975 | Jayne | |
| 4,266,417 A | 5/1981 | Imamura | |
| 4,280,736 A | 7/1981 | Raudman | |
| 4,508,392 A | 4/1985 | LeBlond | |
| 4,639,046 A | 1/1987 | Oleff | |
| 4,732,428 A | 3/1988 | Monte | |
| 4,793,659 A | 12/1988 | Oleff | |
| 4,844,552 A | 7/1989 | Tsygankov | |
| 4,919,490 A | 4/1990 | Hopkins | |
| 4,978,174 A * | 12/1990 | Nosler | B60B 7/0006 |
| | | | 301/37.11 |
| 4,995,675 A | 2/1991 | Tsai | |
| 5,061,013 A * | 10/1991 | Hed | B60B 21/025 |
| | | | 301/64.704 |
| 5,975,645 A * | 11/1999 | Sargent | B60B 5/02 |
| | | | 301/58 |
| 6,145,937 A | 11/2000 | Chen | |
| 6,767,069 B2 | 7/2004 | Chen | |
| 7,029,074 B2 | 4/2006 | Chen | |
| 8,757,733 B2 | 6/2014 | Smart | |
| 8,888,195 B1 | 11/2014 | Hed | |
| 9,346,319 B2 | 5/2016 | Schiers | |
| 9,463,666 B2 | 10/2016 | Hed | |
| 9,770,944 B2 | 9/2017 | Smart | |
| 10,065,450 B2 | 9/2018 | Righini | |
| 10,137,728 B2 | 11/2018 | Hed | |
| 10,874,356 B2 | 12/2020 | Hed | |
| 10,875,356 B2 * | 12/2020 | Hed | B60B 21/10 |
| 11,807,036 B2 | 11/2023 | Hed | |
| 12,109,839 B2 | 10/2024 | Hed | |
| 12,240,268 B2 | 3/2025 | Hed | |
| 12,296,618 B2 | 5/2025 | Hed | |
| 12,330,449 B2 | 6/2025 | Hed | |
| 2008/0088175 A1 | 4/2008 | Hermansen | |
| 2009/0152938 A1* | 6/2009 | Tsai | B60B 5/02 |
| | | | 301/55 |
| 2009/0195055 A1 | 8/2009 | Chen | |
| 2010/0141023 A1* | 6/2010 | Tho | B60B 21/021 |
| | | | 301/95.104 |
| 2011/0115280 A1 | 5/2011 | Mercat | |
| 2012/0062021 A1 | 3/2012 | Lew | |
| 2013/0043717 A1 | 2/2013 | Poertner | |
| 2013/0320748 A1* | 12/2013 | Schlanger | B60B 7/01 |
| | | | 301/55 |
| 2015/0298500 A1 | 10/2015 | McCormick | |
| 2016/0068015 A1* | 3/2016 | Magee | B60B 3/10 |
| | | | 296/180.1 |

| | | | |
|---|---|---|---|
| 2023/0049284 A1 | 2/2023 | Hed | |
| 2023/0051359 A1 | 2/2023 | Hed | |
| 2023/0202229 A1 | 6/2023 | Hed | |
| 2023/0406037 A1 | 12/2023 | Hed | |
| 2025/0033407 A1 | 1/2025 | Hed | |

FOREIGN PATENT DOCUMENTS

| | | | | |
|---|---|---|---|---|
| EP | 0832761 A2 | 4/1998 | | |
| EP | 1262334 A2 * | 12/2002 | ........... | B60B 21/066 |
| FR | 2 583 680 | 12/1986 | | |
| RU | 2096188 C1 * | 11/1997 | | |
| WO | WO 20100141350 | 12/2010 | | |
| WO | WO-2011133561 A1 * | 10/2011 | ............. | B60B 25/00 |
| WO | WO 2020222012 A1 | 11/2020 | | |
| WO | WO 2023035080 A1 | 3/2023 | | |

OTHER PUBLICATIONS

"Mar. 1989 Product Price List," Hed Design, White Bear Lake, MN, US, 1989, 1 pg.

"ZIPP 3000 Composite Molded Wheel Specification Sheet," Hed Design, White Bear Lake, MN, US, 1 pg.

Hed-X aluminum bike rim, Triathlete Magazine, Jun. 1989, 1 pg.

"ZIPP 3000 Data Sheet," Compositech, Indianapolis, IN, U.S., 6 pgs.

"Aerospoke Advertising Brochure," Aerospoke Corp., Milford, MI, US, 2 pgs.

Office Action for U.S. Appl. No. 07/424,492, mailed Aug. 3, 1990, 5 pgs.

Office Action for U.S. Appl. No. 12/553,026, mailed Oct. 3, 2011, 12 pgs.

Office Action for U.S. Appl. No. 12/553,026, mailed Apr. 12, 2012, 11 pgs.

Greenwell, D.I., "Aerodynamic characteristics of low-drag bicycle wheels," Aeronautical Journal, Mar. 1995, 10 pgs.

Office Action for U.S. Appl. No. 12/553,026, mailed Sep. 19, 2012, 12 pgs.

Portions of Zipp Speed Weaponry 2006 Catalog, Zipp Speed Weaponry, Indianapolis, IN, US, 2006, 25 pgs.

Portions of Zipp Speed Weaponry 2007 Catalog, Zipp Speed Weaponry, Indianapolis, IN, US, 2007, 26 pgs.

Portions of Zipp Speed Weaponry 2008 Catalog, Zipp Speed Weaponry, Indianapolis, IN, US, 2008, 17 pgs.

Portions of Zipp Speed Weaponry 2009 Catalog, Zipp Speed Weaponry, Indianapolis, IN, US, 2009, 16 pgs.

"New Product Spotlight: Zipp 303 Cyclocross Tubular Wheels—The Pro's Choice for 2009?," Cyclocross Magazine, retrieved on Sep. 25, 2012, Aug. 23, 2009, 5 pgs.

Office Action for U.S. Appl. No. 12/553,026, mailed Feb. 12, 2013, 11 pgs.

Hed Cycling Products Brochure, Hed Cycling, Shore View, MN, US, 2007, 7 pgs.

Hed Cycling Products Brochure, Hed Cycling, White Bear Lake, MN, US, Apr. 2005, 23 pgs.

Hed Cycling Products Brochure, Hed Cycling, White Bear Lake, MN, US, 1999, 29 pgs.

Office Action for U.S. Appl. No. 12/553,026, mailed Jul. 11, 2013, 8 pgs.

Office Action for U.S. Appl. No. 12/553,026, mailed Dec. 27, 2013, 10pgs.

Machine-generated English translation of RU 2096188 C1.

Office Action for U.S. Appl. No. 15/276,199, mailed Dec. 6, 2017, 14 pgs.

Office Action for U.S. Appl. No. 16/184,712, mailed Jul. 30, 2019, 9 pgs.

Office Action for U.S. Appl. No. 16/184,712, mailed Jan. 14, 2020, 10 pgs.

Office Action for U.S. Appl. No. 16/184,712, mailed May 20, 2020, 9 pgs.

Office Action for U.S. Appl. No. 17/133,287, mailed Sep. 12, 2022, 11 pgs.

(56) References Cited

OTHER PUBLICATIONS

Office Action for U.S. Appl. No. 17/975,491, mailed Feb. 6, 2023, 15 pgs.

Office Action for U.S. Appl. No. 17/975,550, mailed Feb. 10, 2023, 15 pgs.

Office Action for U.S. Appl. No. 18/172,334, mailed Jul. 11, 2023, 13 pgs.

Greenwell, et al., "Aerodynamic Characteristics of Low-Drag Bicycle Wheels," Aeronautical Journal, Mar. 1995, 10 pgs.

Office Action for U.S. Appl. No. 17/975,550, mailed Jul. 17, 2023, 15 pgs.

Office Action for U.S. Appl. No. 17/975,491, mailed Aug. 14, 2023, 16 pages.

Office Action for U.S. Appl. No. 17/975,491, mailed Nov. 29, 2023, 18 pgs.

Office Action for U.S. Appl. No. 17/975,550, mailed Nov. 29, 2023, 17 pgs.

Office Action for U.S. Appl. No. 18/172,334, mailed Dec. 1, 2023, 14 pgs.

Office Action for U.S. Appl. No. 17/975,491, mailed Mar. 7, 2024, 22 pgs.

Office Action for U.S. Appl. No. 17/975,550, mailed Mar. 8, 2024, 12 pgs.

Office Action for U.S. Appl. No. 18/462,312, mailed Mar. 19, 2024, 22 pgs.

Office Action for U.S. Appl. No. 18/172,334, mailed Apr. 8, 2024, 20 pgs.

Office Action for U.S. Appl. No. 17/975,550, mailed Jun. 25, 2024, 13 pgs.

Office Action for U.S. Appl. No. 17/975,491, mailed Jun. 28, 2024, 18 pgs.

Notice of Allowance for U.S. Appl. No. 18/462,312, mailed Aug. 5, 2024, 5 pgs.

Office Action for U.S. Appl. No. 18/172,334, mailed Aug. 16, 2024, 6 pgs.

Notice of Allowance for U.S. Appl. No. 17/975,491, mailed Oct. 10, 2024, 4 pgs.

Office Action for U.S. Appl. No. 17/975,550, mailed Oct. 17, 2024, 5 pgs.

Notice of Allowance for U.S. Appl. No. 18/172,334, mailed Jan. 2, 2025, 5 pgs.

Office Action for U.S. Appl. No. 18/468,524, mailed Dec. 19, 2025, 19 pgs.

* cited by examiner

METHOD FOR MANUFACTURING A DEEP AERODYNAMIC BICYCLE WHEEL

RELATED APPLICATIONS

This application claims the benefit of priority under 35 U.S.C. 119 (e) of U.S. Provisional Patent Application No. 63/414,382 entitled "Deep Aerodynamic Bicycle Wheel," filed Oct. 7, 2022, which is hereby fully incorporated by reference herein.

This application hereby incorporates U.S. Provisional Patent Application No. 63/516,843, entitled "Deep Aerodynamic Bicycle Wheel," filed Jul. 31, 2023, and U.S. patent application Ser. No. 18/468,524, entitled "Rim for Deep Aerodynamic Bicycle Wheel," filed Sep. 15, 2023, by reference in their entireties.

TECHNICAL FIELD

Embodiments of the present disclosure relate to bicycle wheels. Even more particularly, embodiments of the present disclosure relate to deep aerodynamic bicycle wheels and related methods.

BACKGROUND

Bicycle wheels, particularly those used in competitive cycling, are increasingly being designed to be lightweight and aerodynamically efficient.

Rim-and-spoke type wheels are the most used wheels on racing bicycles. A rim-and-spoke wheel has an outer rim, a hub, and spokes that extend from the hub. In rim-and-spoke type wheels flow of air over and around the spokes is a significant source of drag. Traditionally, rim-and-spoke wheels had rims with a depth less than 30 mm. More recently, wheel manufacturers have produced "deep section" wheels that reduce drag compared to shallower rims. These wheels have deep section rims that are typically 30-90 mm deep, with rims from 70-90 mm being considered super deep. Most riders use rims that are less than 50 mm.

Deep section rims are often lenticular or elliptical, where the sidewalls of the rim have a constant radius or follow a single ellipse from the outer portion of the rim to the nose. While existing deep section rims may provide drag advantages over shallower rims by providing good airflow characteristics at the front portion of the wheel where the tire acts as the leading edge, they leave a trailing wake off the nose that prevents air reattachment at the rear portion of the wheel where the nose acts as the leading edge. Thus, deep section wheels still suffer significant drag from air flow over and around the spokes.

The spokes of deep section wheels attach to the rim at or near the nose. Thus, compared to a shallower rim, a deep section rim requires an extended load bearing structure capable of transferring radial load to the spokes, and thus significantly more structural material. The depth of deep section rims is limited, in part, because the increased weight of load bearing material offsets any aerodynamic gain.

Unlike conventional rim-and-spoke wheels, a disc wheel has side surfaces that are disc-shaped and have no significant open spaces. Some disc wheels are generally flat on both sides and attempt to eliminate the spoke drag by eliminating the spokes. These are built from various composite materials and are vertically stiff resulting in a harsh ride. Skinned disc wheels, on the other hand, reduce spoke drag by covering the spokes with panels made of composite materials, such as carbon fiber, or other materials. The panels extend from the outer rim to the hub to block airflow around and between the spokes. If the underlying rim-and-spoke wheel is one that has spokes that require nesting and truing, the manufacturer nests and trues all the spokes before applying the composite panels to the wheel.

While disc wheels can provide the aerodynamic advantage of lower drag, they become unstable in crosswinds because they have a large cross section against which the wind can push. This can make the bicycle difficult to ride and even lead to crashes in windy conditions. Disc wheels are thus primarily used for indoor track events and shorter sprint events. Some competitive events exclude the use of a disc wheel as the front wheel, the rear wheel, or entirely.

Some disc wheels are shaped like a flat (or approximately flat) plate. Flat disc wheels provide drag advantages over rim-and-spoke wheels but are highly unstable in crosswinds. Other disc wheels are lenticular, curving with a constant radius from the outer portion of the rim to the area of the disc that attaches to the hub. Lenticular disc wheels provide reduced drag and good airflow characteristics at the front of a wheel but create a trailing wake that prevents air reattachment to the rear of the wheel. Lenticular disc wheels also suffer instability in crosswinds. Some "semi" lenticular discs wheels have been developed with one side cambered with a constant radius and the other side essentially flat, typically to accommodate gear trains with many gears. Semi-lenticular disc wheels are somewhat stable if the wind is coming from one side and less stable if the wind is coming from the other side because the asymmetry of the wheel develops lift in one direction.

Despite the aerodynamic advantages the deeper wheels can have, non-disc wheels generally have rim depths of under 90 mm. This is due, at least in part, because conventional methods of building wheels are not suited for building deeper non-disc wheels. As such, new methods of building wheels are needed.

SUMMARY

Embodiments include bicycle wheels and methods of manufacturing bicycle wheels. Bicycle wheels manufactured according to the present disclosure include shaped skins that fare a significant portion (e.g., the majority) of the spokes' length, leaving a center opening. In an assembled wheel, there is thus a gap between the nose of the rim. With the center opening in a non-solid wheel, a large portion of the side force can be vented to create a more stable ride. Embodiments of the aerodynamic wheel disclosed herein can provide significant aerodynamic advantages over prior art non-disc aerodynamic rims (approaching or in some cases as effective as a full disc wheel), but with significantly more stability than a full disc to increase stability when ridden (e.g., increase safety).

One aspect of the present disclosure includes a method for building a deep aerodynamic wheel. The wheel building method can include providing a base rim, the base rim having a plurality of anchor holes and positioning a fairing relative to the base rim, where the fairing is formed of a composite material and has an outer portion that is bendable away from the base rim. The fairing defines a pattern of spoke access openings. The fairing extends from an open end to a nose and defines a central opening. The method may further include positioning a hub in the central opening with a gap between the hub and the nose of the fairing. A plurality of spokes may be inserted into the hub. The wheel building method can further include feeding each spoke from a first side of the fairing to a second side of the fairing through a respective spoke access opening in the fairing, pulling the fairing back from the base rim to provide a work opening, manipulating the spokes from the second side of the fairing via the work opening to guide the spokes to respective anchor openings in the base rim, and attaching the spokes to the base rim using a respective spoke nipple. The wheel building method can further comprise bonding the outer portion of the fairing to the base rim to create a deep aerodynamic rim. In some embodiments, one side of the fairing is bonded to the base rim prior to attaching the plurality of spokes to the base rim and the second side is bonded after attaching the spokes to the base rim.

According to one embodiment, the deep aerodynamic rim has a rim depth of at least 110 mm. Preferably, the rim depth is from 110 mm to 240 mm.

One embodiment can comprise attaching a spoke to the base rim using the respective spoke nipple comprises holding the spoke within 90 mm of the spoke nipple as the respective spoke nipple is threaded onto the spoke, wherein the spoke is accessed via the work opening. For example, the spoke can be grasped to prevent twisting. More particularly, in some embodiments, the spoke is grasped at a location that is 20 mm to 70 mm from the respective spoke nipple as the respective spoke nipple is threaded onto the spoke.

Embodiments can further comprise truing the deep aerodynamic wheel, where truing the deep aerodynamic wheel may include, for each of the plurality of spokes, manipulating the respective spoke nipple to increase tension in the spoke to reach a desired tension. According to one embodiment, the spoke is accessed via the work opening and held within 90 mm of the respective spoke nipple to resist twist in the spoke. Even more particularly, the spoke is grasped at a location that is 20 mm to 70 mm from the respective spoke nipple as the respective spoke nipple is threaded onto the spoke. In some embodiments, the fairing is attached to the base rim after truing the deep aerodynamic wheel.

Some embodiments include bending each of the spokes to guide them through the respective access openings.

According to one embodiment, the deep aerodynamic wheel is a 700c wheel and has a rim depth of 110 mm to 240 mm.

According to one embodiment, the fairing is a carbon fiber fairing. The fairing may be formed as a single piece construction, or of multiple pieces.

The fairing, according to one embodiment, has an outer portion of a first thickness, and wherein the nose has a second thickness that is greater than the first thickness.

The wheel building method may include, for each of the plurality spokes, turning the respective spoke nipple a known number of turns to achieve a correlated tension.

The fairing, according to one embodiment, is symmetrical about a centerline.

The spokes may be metal spokes, polymer spokes, or other types of spokes.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale for the purpose of clarity.

DETAILED DESCRIPTION

Figure 1A:
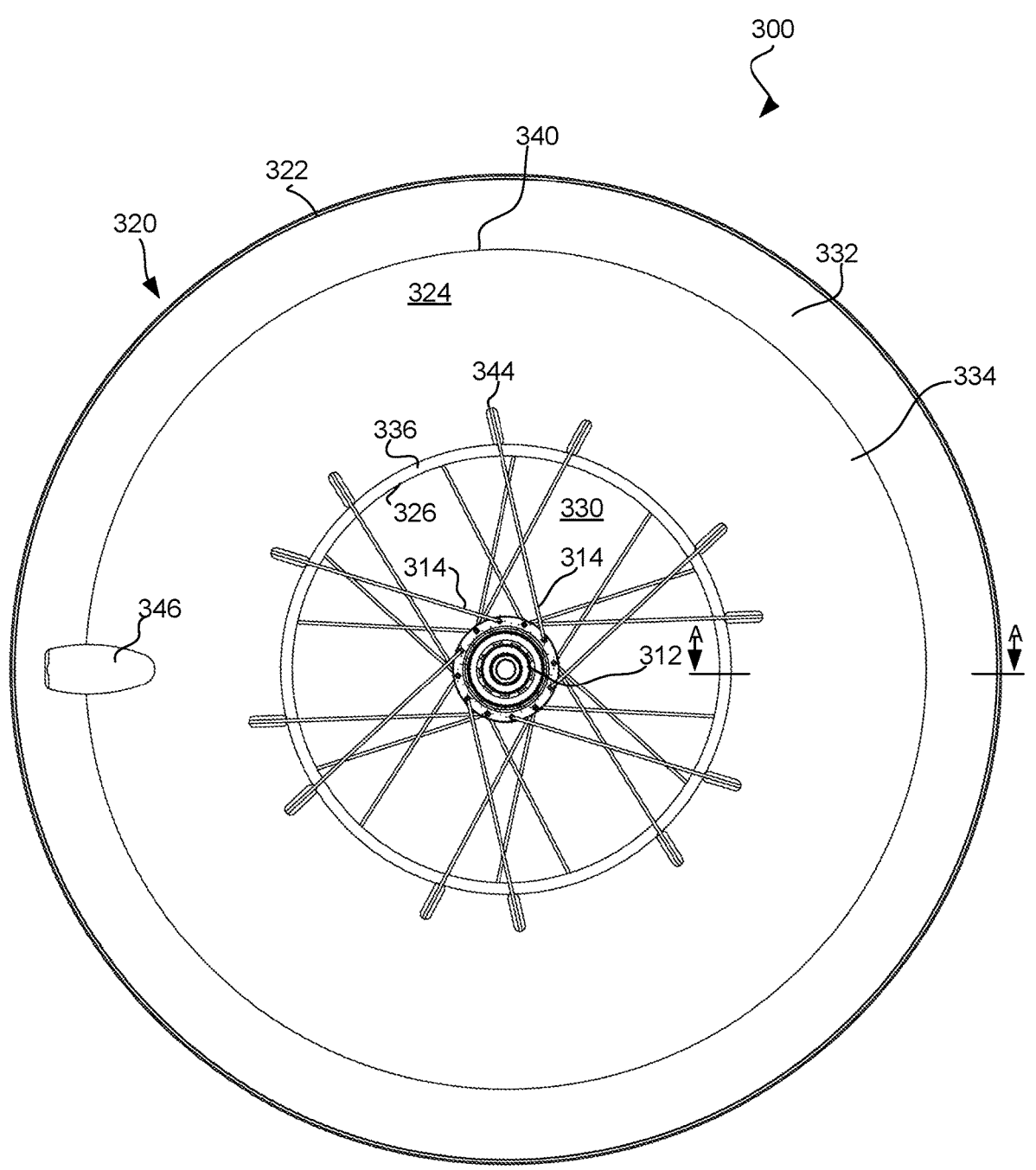
FIG. 1A illustrates a side view of one embodiment of a deep aerodynamic bicycle wheel.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure include methods of assembling deep aerodynamic bicycle wheels. Embodiments further include bicycle wheels assembled by coupling (adhering or otherwise joining) a lightweight "skin" of carbon fiber or other composite material to a bicycle rim to create a deeper aerodynamic rim. The skin can extend a significant distance from the outer edge of the rim towards the hub at the center of the bicycle wheel, but the skin terminates at a nose prior to the hub itself, leaving a central opening (e.g., a "donut hole"). According to one embodiment, the sides of the skin (distal the nose) get adhered to each outer face of the bicycle rim. In one embodiment, the skin is a single piece construction having a curved nose section nearer the hub and an open section opposite the nose, where each side of the open section of the skin ultimately gets adhered to the face of the wheel rim (one side of the skin gets adhered to one rim face and the other side of the skin gets adhered to the other rim face). In an alternative embodiment, the skin can comprise two different sections that, in addition to being joined to the rim, are also joined to one another at the ends distal the rim to form the nose. The skin, in some embodiments, may comprise two or more sections that are joined together. The skin extends the rim further from the rim than prior art bicycle wheels, while still maintaining an opening at the center of the bicycle wheel (unlike prior art "disc" wheels).

As discussed above, prior non-disc deep section rims were typically less than 90 mm deep. Embodiments of the present invention can extend rims much deeper, for example, to depths of 110 mm to 240 mm for a 700c wheel (Internal Standards Organization (ISO) 622 mm wheel), while leaving a central opening to vent wind. The precise depth can be tuned to the aerodynamic performance needs of the wheel and the handling characteristics desired. For example, while a deeper aerodynamic rim section will almost always increase the aerodynamics of the wheel, the additional depth of the rim may, in certain circumstances (e.g., high winds,) increase the effects of environmental conditions on the wheel, and therefore the handling of the bicycle on which the wheel is installed. The deeper bicycle wheel described herein provides advantages over prior art bicycle wheels by increasing the aerodynamic benefits, while still retaining an open center in the deeper wheel.

Examples of bicycle wheels that may be built using techniques described herein include, but are not limited to, bicycle wheels shaped as described in U.S. Provisional Patent Application No. 63/516,843, entitled "Deep Aerodynamic Bicycle Wheel," filed Jul. 31, 2023, or U.S. patent application Ser. No. 18/468,524, entitled "Rim for Deep Aerodynamic Bicycle Wheel," filed Sep. 15, 2023, which are incorporated herein by reference in their entireties.

Figure 1B:
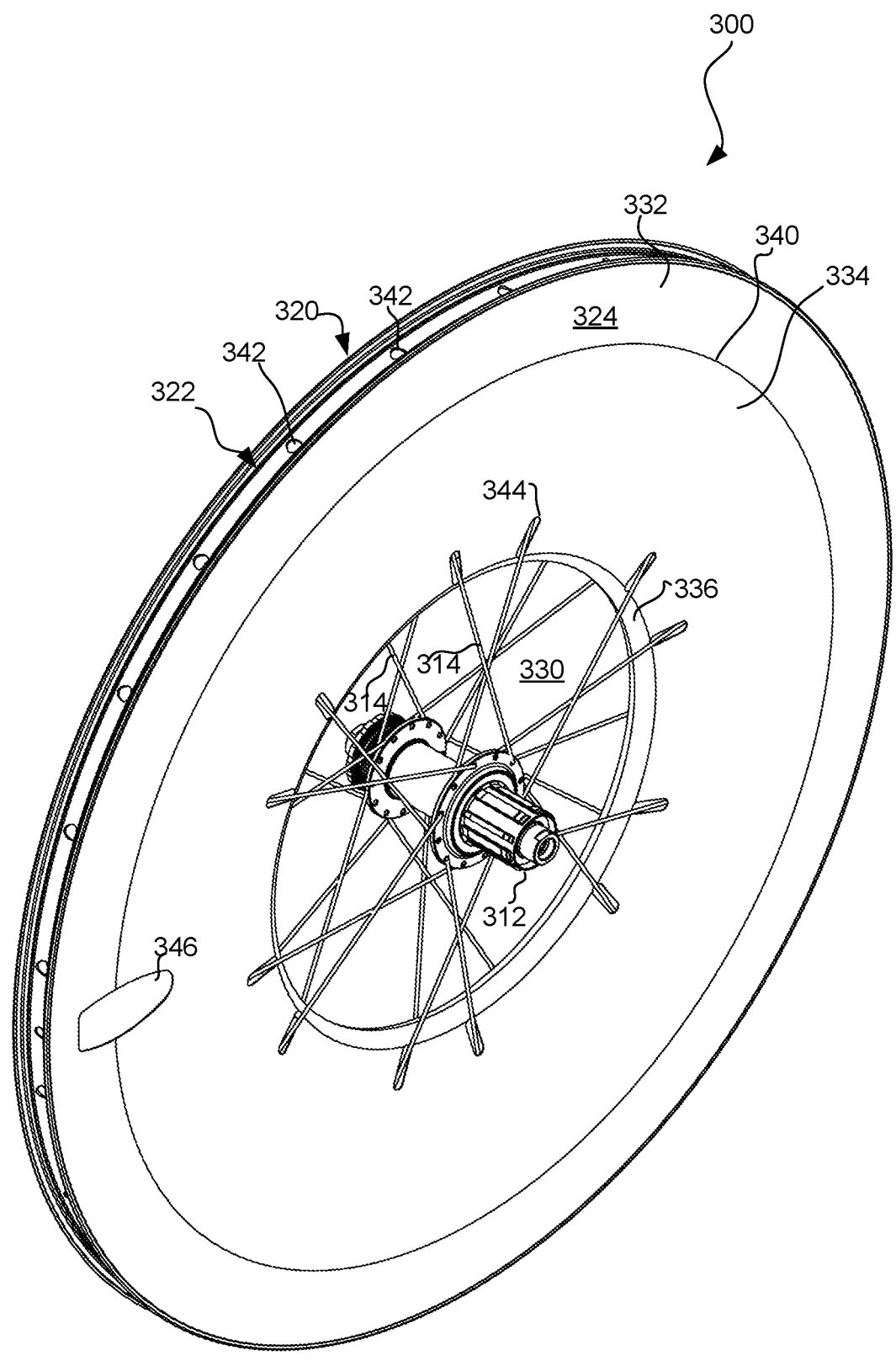
FIG. 1B illustrates a perspective view of the embodiment of FIG. 1A.
Figure 1C:
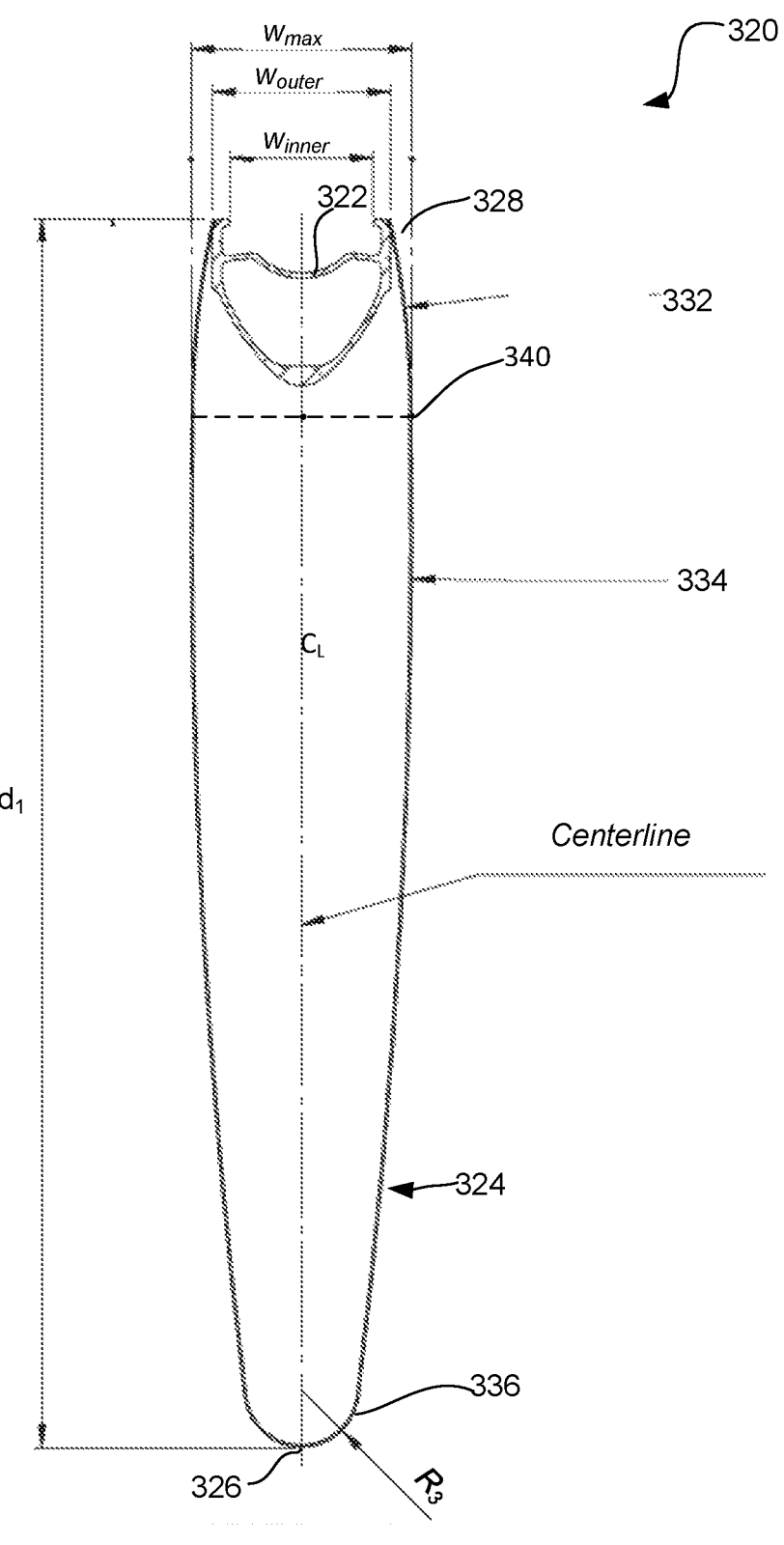
FIG. 1C illustrates a cross-sectional view of the embodiment of FIG. 1A

FIG. 1A, FIG. 1B, and FIG. 1C (collectively FIG. 1) illustrate one embodiment of a wheel 300 with a deep aerodynamic rim 320. More particularly, FIG. 1A is a side view of wheel 300, FIG. 1B is a perspective view of wheel 300 and FIG. 1C is a cross-section A-A of one embodiment of deep aerodynamic rim 320. Even more particularly, FIG. 1 represents an embodiment of an ISO 622 mm wheel (that is, a 700C) wheel having a rim depth (d1) of 180 mm deep measured from the outer circumference of rim 320 to the inner circumference of rim 320.

Figure 2A:
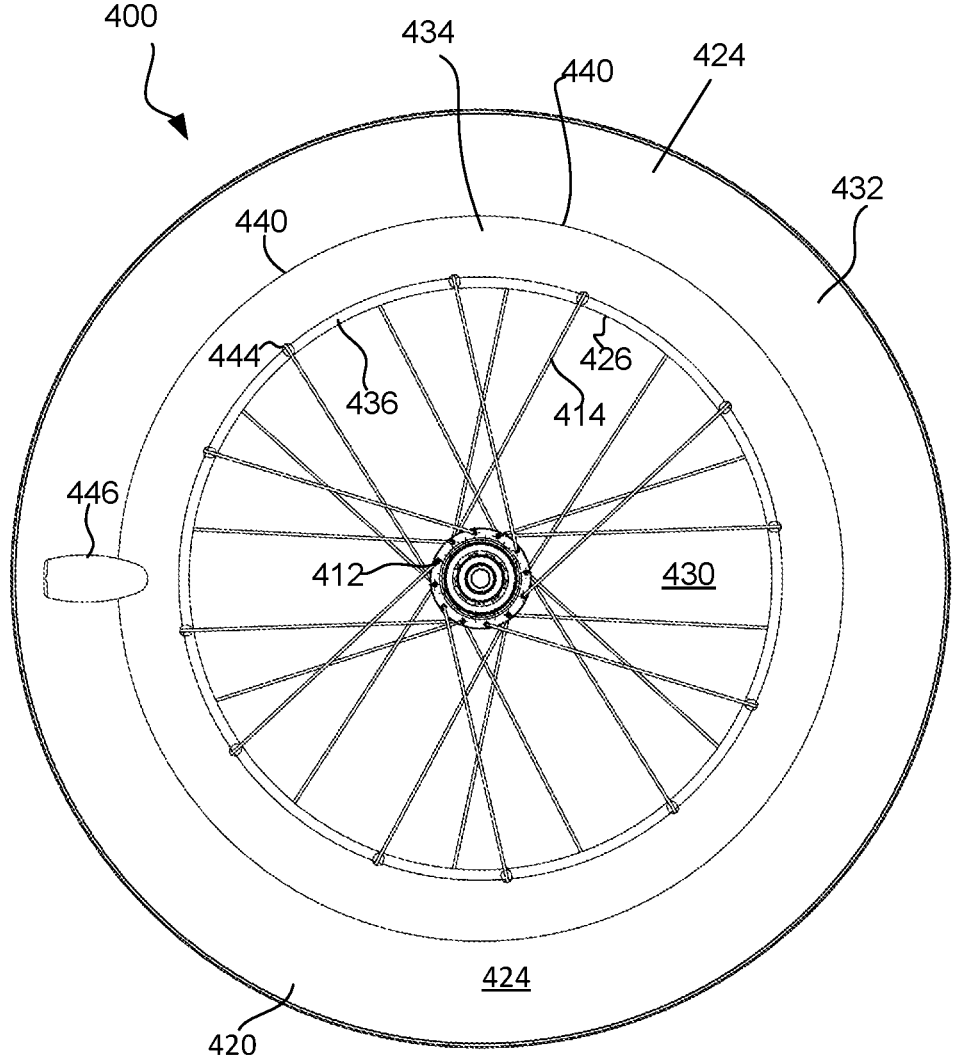
FIG. 2A illustrates a side view of one embodiment of a deep aerodynamic bicycle wheel.
Figure 2B:
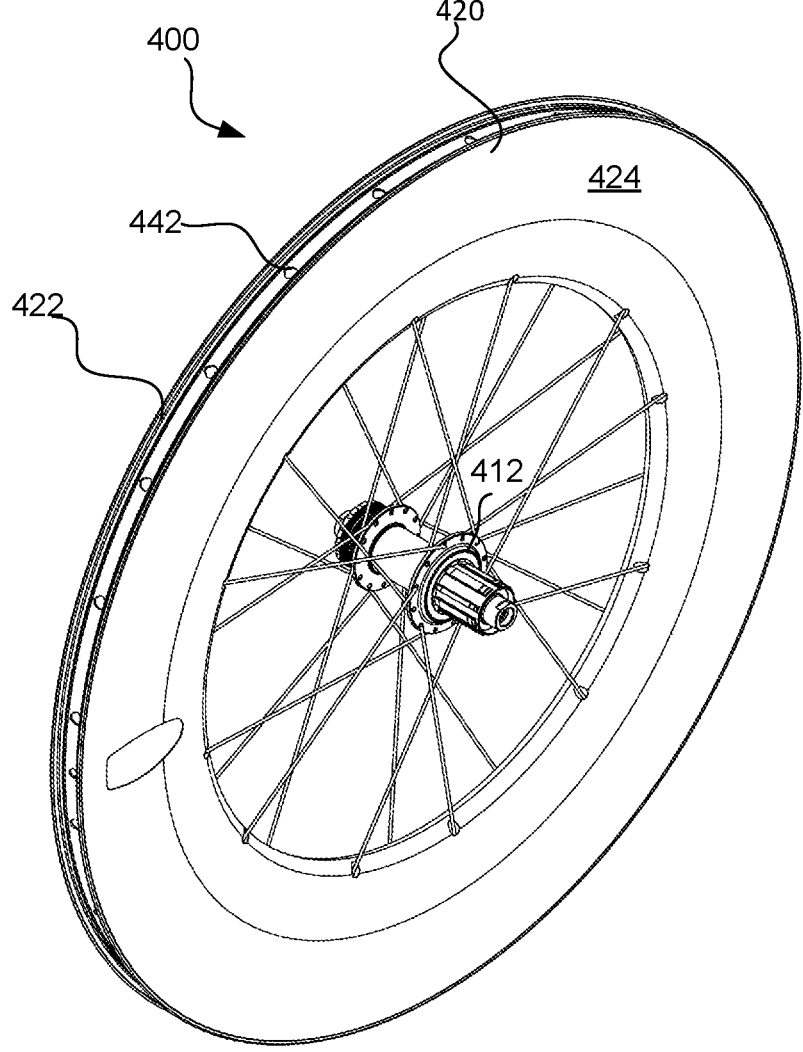
FIG. 2B illustrates a perspective view of the embodiment of FIG. 2A.
Figure 3A:
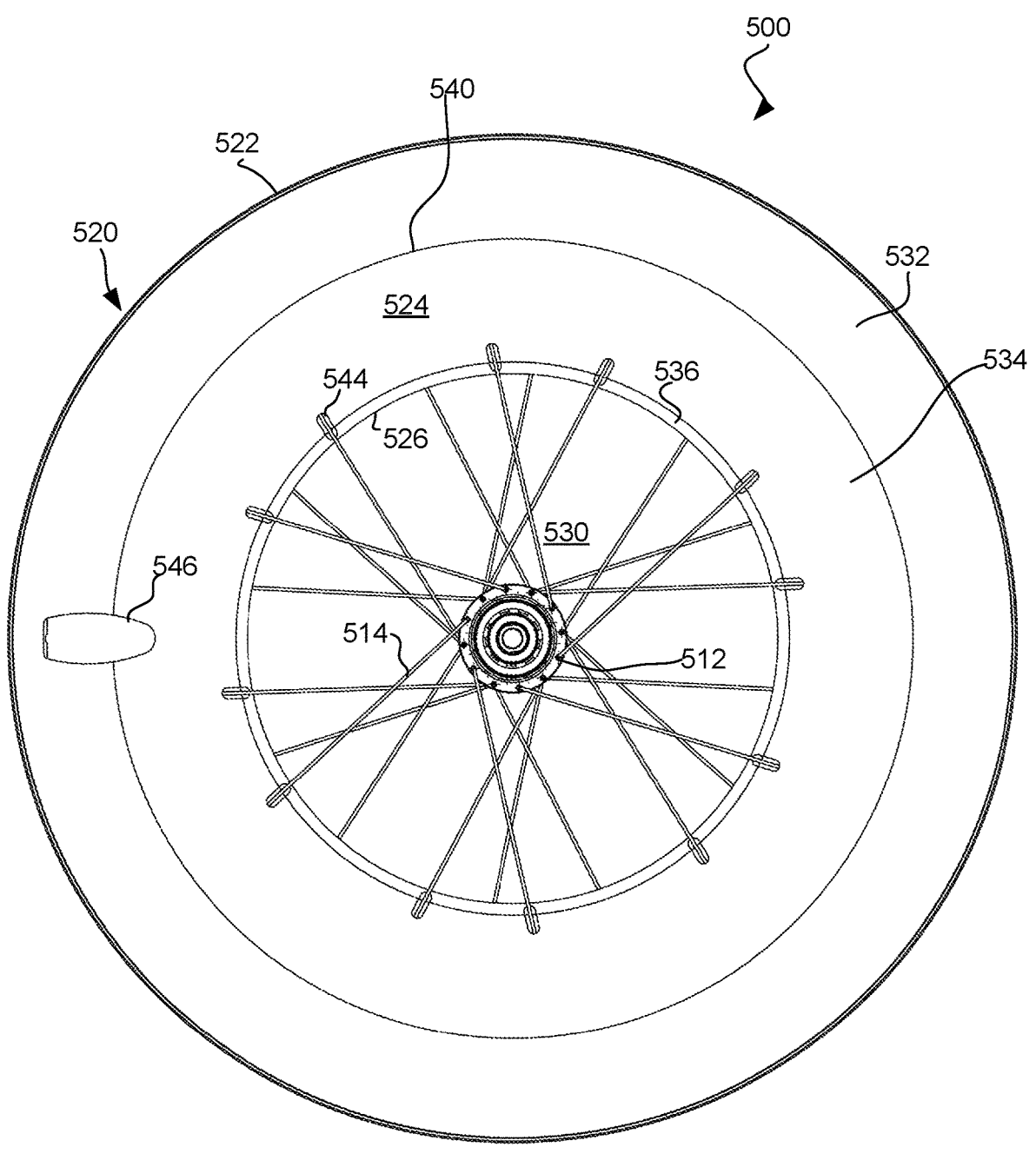
FIG. 3A illustrates a side view of one embodiment of a deep aerodynamic bicycle wheel.
Figure 3B:
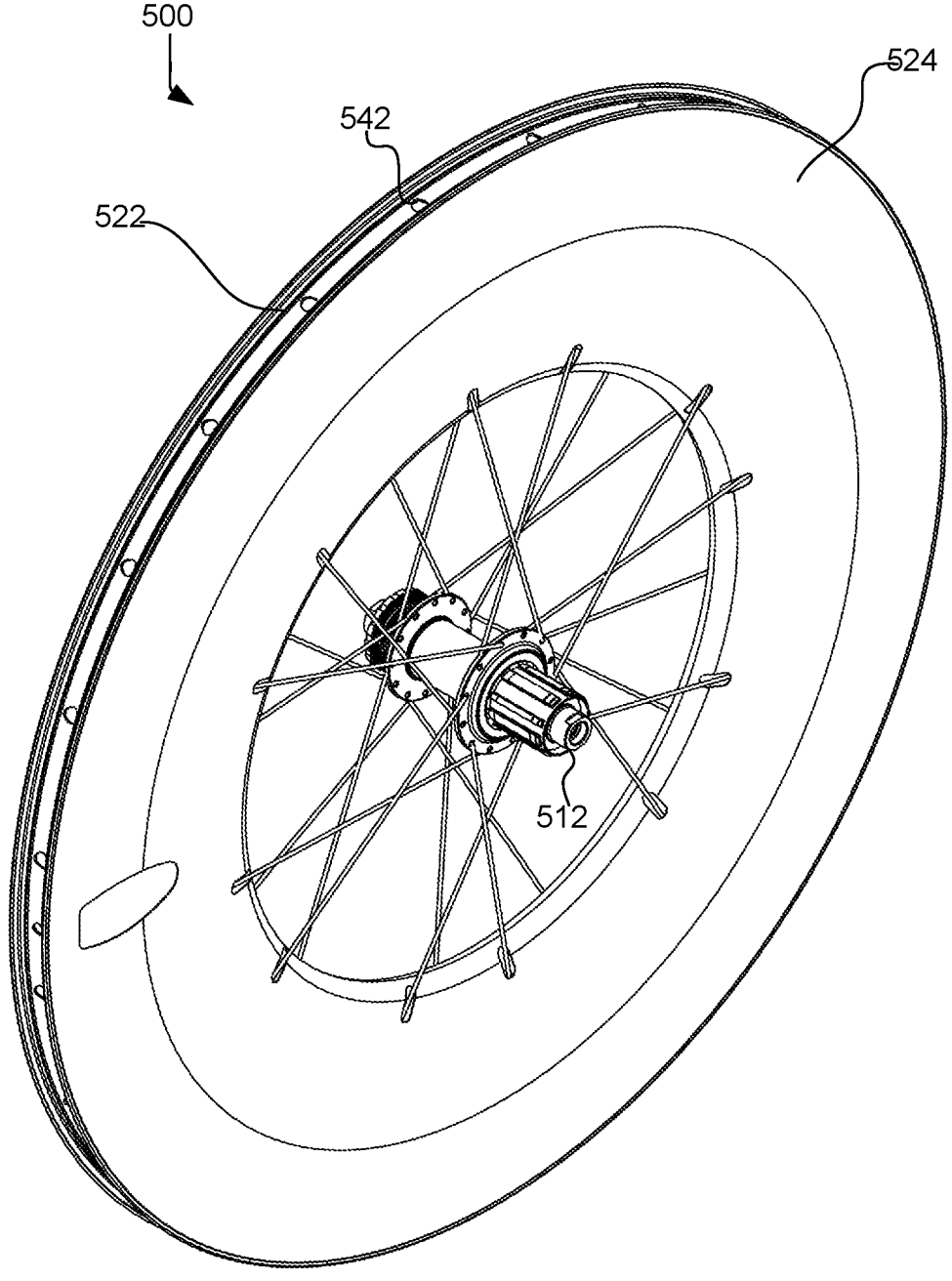
FIG. 3B illustrates a perspective view of the embodiment of FIG. 3A.
Figures 4A, 4B:
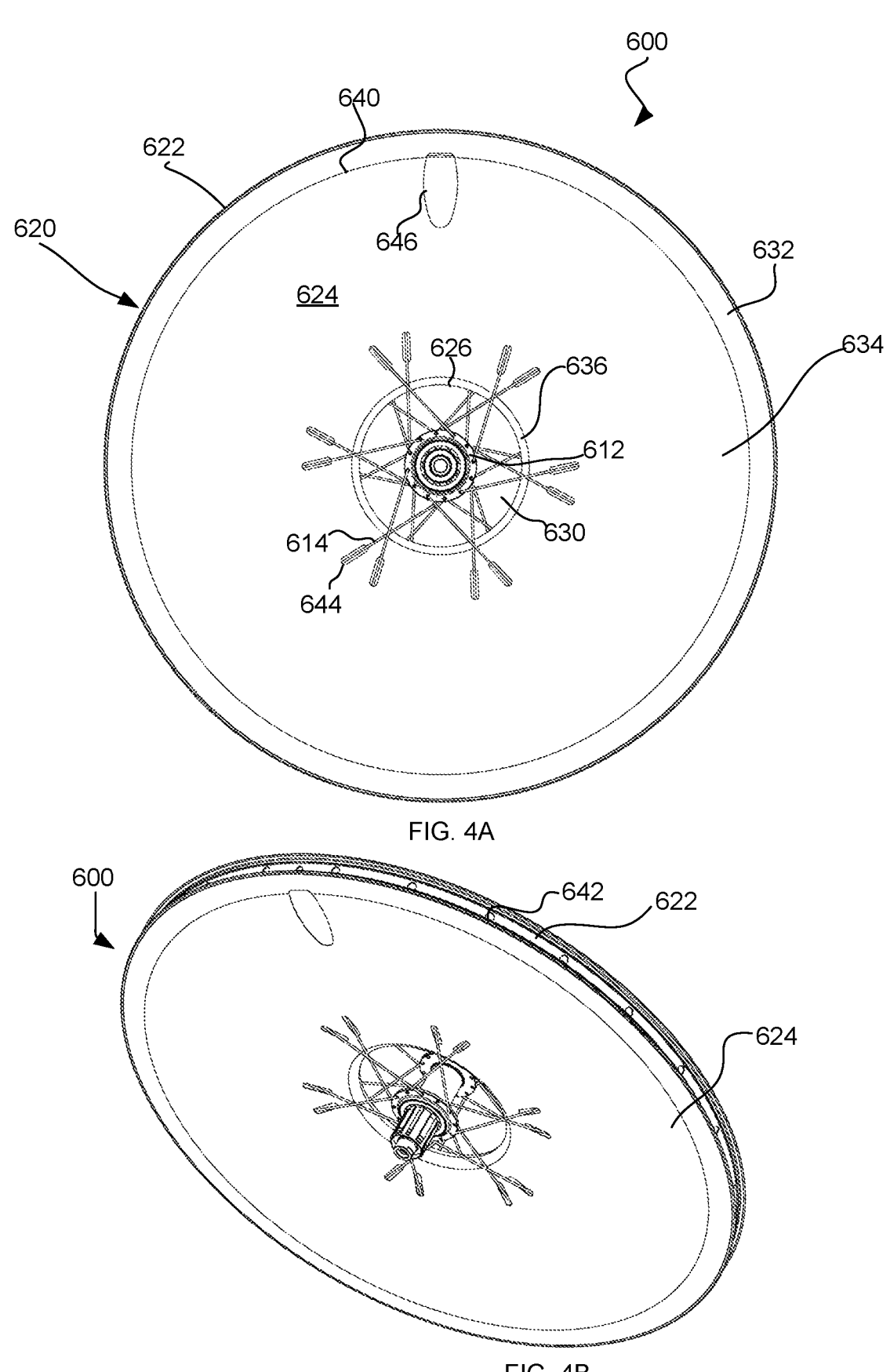
FIG. 4A illustrates a side view of one embodiment of a deep aerodynamic bicycle wheel.
FIG. 4B illustrates a perspective view of the embodiment of FIG. 4A.

As discussed, rims of different depths can be created using fairings of different depths (even with the same model of base rim). Using the example of an ISO 622 mm wheel, FIG. 2A and FIG. 2B (collectively FIG. 2) illustrate one embodiment of a wheel 400 having a rim depth of 120 mm, FIG. 3A and FIG. 3B (collectively FIG. 3) illustrate one embodiment of a wheel 500 having a rim depth of 150 mm, and FIG. 4A and FIG. 4B (collectively FIG. 4) illustrate one embodiment of a wheel 600 having a 240 mm rim depth.

Deep aerodynamic rim 320, 420, 520, 620 is, according to one embodiment, a skin on rim assembly that comprises an outer base rim 322, 422, 522, 622 to which a fairing 324, 424, 524, 624 formed of a composite skin (e.g., a carbon fiber of other skin) is adhered or otherwise attached. Base rim 322, 422, 522, 622 may be formed of any suitable materials, such as, but not limited to metal (e.g., steel, aluminum, or other metals) or composite materials (e.g., a carbon fiber or other composite material) and have an "inner width" ($W_{inner}$) and "outer width" ($W_{outer}$). In some embodiments, base rim 322, 422, 522, 622 is a rim-and-spoke type rim that generally bears the loads of spokes 314 and a tire. Base rim 322, 422, 522, 622 may have a variety of form factors, and in some embodiments, is a prior art or otherwise existing rim to which fairing 324, 424, 524, 624 is added. While FIG. 1C illustrates base rim 322 as a hooked rim, base rim 322, 422, 522, 622 may be a hookless rim in other embodiments.

Fairing 324, 424, 524, 624 (e.g., the skin section) is bonded onto/adhered to or otherwise coupled to base rim 322, 422, 522, 622 to provide an aerodynamic shape to base rim 322, 422, 522, 622 or enhance the aerodynamic shape of base rim 322, 422, 522, 622. Fairing 324, 424, 524, 624 provides little if any radial support to maintain the wheel's shape. According to one embodiment, fairing 324, 424, 524, 624 is molded as a single skin having, for example, a generally "U" shape that extends from an open outer end (e.g., open outer end 328 of fairing 324 is illustrated in FIG. 1C) at an outer circumference to an inner circumference 326, 426, 526, 626. During assembly, the inner side faces of the open outer end of fairing 324, 424, 524, 624 are bonded, adhered, or otherwise coupled to the outer side faces of base rim 322, 422, 522, 622. The precise profile of fairing 324, 424, 524, 624 can be selected based on the performance needs of the wheel and the handling characteristics desired. In embodiments of FIGS. 1-4, fairing 324, 424, 524, 624 has a first section 332, 432, 532, 632 from the radially outer end of the fairing to a widest part 340, 440, 540, 640 of the rim profile, a second section 334, 434, 534, 634 from the widest part 340, 440, 540, 640 of the rim profile to the start of the nose 336, 436, 536, 636 and nose 336, 436, 536, 636. Each of these portions can be tuned to create a profile having desired aerodynamic characteristics as described, for example, in U.S. Provisional Patent Application No. 63/516, 843, entitled "Deep Aerodynamic Bicycle Wheel," filed Jul. 31, 2023, or U.S. patent application Ser. No. 18/468,524, entitled "Rim for Deep Aerodynamic Bicycle Wheel," filed Sep. 15, 2023, which are incorporated by reference herein in their entireties.

Spokes 314, 414, 514, 614 connect on one end at the hub 312, 412, 512, 612 (e.g., to the hub flanges on either side of wheel 300, 400, 500, 600), pass through access holes 344, 444, 544, 644 in fairing 324, 424, 524,624 and then attach at their distal ends to base rim 322, 422, 522, 622. For example, spokes 314, 414, 514, 614 may be attached to base rim 322, 422, 522, 622 using spoke nipples disposed in spoke anchor openings 342, 442, 542, 642 of base rim 322, 422, 522, 622. Fairing 324, 424, 524, 624 further includes a valve stem access hole 346, 446, 546, 646 to allow the rider to access a tire's valve stem when the tire is mounted.

In some embodiments, metal spokes 314, 414, 514, 614 are used, which can damage fairing 324, 424, 524, 624 if fairing 324, 424, 524, 624 rubs against them during assembly or use. An alternative embodiment of the deeper aerodynamic wheel described herein can utilize polymer (rather than metal) spokes (e.g., Ultra High Molecular Weight Polyethylene (UHMWPE) spokes manufactured by Berd LLC of Hopkins, MN). In any case, access holes 344, 444, 544, 644 can be positioned, oriented, and sized so fairing 324, 424, 524, 624 does not rub against spokes 314, 414, 514, 614 in use. In addition, or in the alternative, a lubricant, low friction sheath, bushing or other mechanism is provided between the spokes and the edges of access holes 344, 444, 544, 644 to prevent damage to fairing 324, 424, 524, 624 from contact with spokes 314, 414, 514, 614.

When the deeper bicycle wheel 300, 400, 500, 600 is complete, the deeper bicycle wheel 300, 400, 500, 600 has a central opening 330, 430, 530, 630 between nose 336, 436, 536, 636 and hub 312, 412, 512, 612. Thus, the deeper aero wheel described herein maintains a relatively smaller opening 330, 430, 530, 630 compared to traditional rim-and-spoke wheels, but still includes an opening, as distinguished from disc wheels. Bicycle wheel 300, 400, 500, 600 achieves the drag advantages of greater depths while still maintaining a central opening to vent crosswinds. The aerodynamic profile of fairing 324, 424, 524, 624 may be tuned to achieve other aerodynamic advantages.

For bicycle wheels, the more drag can be decreased, the faster the bicycle will be able to be ridden for a given pedaling power input. Generally, the deeper a rim is, the greater the aerodynamic benefit. Additionally, the churning of the air created by the spokes turning creates aerodynamic drag. Thus, the less spoke that is exposed (e.g., covered by the deeper skin/rim), the more generally aerodynamic the wheel will be. As an illustration of the importance of aerodynamic efficiency and lower weight, it is noted that professional cyclists generally average an output of 0.75 horsepower (or less) over the course of a typical distance professional cycling race. Thus, even relatively minor increases in aerodynamic efficiency of a bicycle wheel can have a substantial positive effect on the speed of the rider.

Embodiments of deeper aerodynamic wheels described herein provide aerodynamic advantages over prior art wheels. In one embodiment, deeper aerodynamic wheels described herein have a generally symmetric shape (see e.g., FIG. 1C) so that the right and left side of the wheel have a similar curvature of the skin—for example, in a rear wheel, the curvature on the cassette side of the wheel is generally the same as the curvature on the non-cassette side of the wheel. In this embodiment of the deeper aerodynamic wheel described herein, the curvature of the skin curves out from the edge of rim (near the tire bed) to the widest point of the skin/rim (e.g., at first section 332, 432, 532, 632), then curves back in from the widest point to the beginning of the nose (e.g., at section 334, 434, 534, 634).

In one embodiment, the deeper aerodynamic wheel described herein has a profile in the horizontal plane that develops pressure recovery in the front portion of the wheel (the portion of the wheel that first encounters wind/air when moving the bicycle forward), thereby reducing drag. In one embodiment, the curvature of the fairing 324, 424, 524, 624 profile in the horizontal plane helps maintain attachment of airflow on the wheel. In one embodiment of the deeper aerodynamic wheel described herein, the curvature from the start of the nose section to the widest portion of the wheel can be a generally increasing curvature (and can be a generally decreasing curvature from the widest portion of the rim to the rim section of the wheel). In addition to the curvature from the widest portion of the rim to the end of the nose section, the deeper aerodynamic wheel described herein has a curvature on the nose section itself. The nose section, in one embodiment, has a radius of curvature that is symmetric about a circumferential centerline of the nose and, the radius of curvature of the nose enables reattachment of air to the rim at the rear portion of the wheel. For example, as the air passes over the front portion of the wheel (e.g., portion contacted by air initially before the donut hole), that air subsequently passes into the open section of the wheel (e.g., where the airflow is exposed to both spokes and the hub), and the flow in this region increases in turbulence. The aerodynamics of the deeper wheel herein is improved by airflow "re-attaching" to the wheel at the rear portion of the wheel. However, as a general rule, the more turbulent the airflow, the more difficult re-attachment becomes. The nose shape of the deeper aerodynamic wheel described herein has a "re-entry shaped" profile that encourages re-attachment of the air at the rear portion of the wheel. As this embodiment of the wheel is moving, the air passes over the front portion of the wheel and through the open section of the wheel and contacts the nose, which has a re-entry shape that allows for re-attachment of the air at the rear portion of the wheel, thereby reducing drag.

As will be appreciated, assembling a rim-and-spoke type wheel requires attaching the spokes to the rim, typically using spoke nipples. In prior rims, even so-called "deep" rims, the spokes attached near the nose of the rim such that the spoke nipples were easily accessible. However, this requires extending structural material to the nose to support the loads of the spokes. Embodiments described herein allow for deeper non-disc rims but present some impediments to conventional assembly methods. For context, some of the issues with prior art wheel assembly methods will be discussed using the example of a 700c wheel (ISO 622 mm wheel). The required spoke length for 700c wheels is approximately 290 mm.

Building a rim-and-spoke type bicycle wheel can comprise: 1) inserting the spokes into the hub; 2) feeding the first spoke to the appropriate anchor hole in the rim by inserting a nipple into the anchor hole from the tire side of the rim; 3) threading the nipple onto the spoke a few turns, but not to the final setting. 3) weaving the next spoke spokes through the attached spoke and attaching the spoke to the rim the same way; 4) continue attaching and weaving the spokes in the same manner until they are all attached to the anchor holes in the rim in the correct place and pattern; 5) tightening the spokes gradually to a specified tension, while gauging the lateral and vertical runout of the wheel to ensure that it is "true."

According to embodiments described herein, once a spoke has been attached at the hub (and weaved through already attached spokes) the spoke is fed through an access hole in the skin, then steered to the appropriate anchor hole in the rim section (e.g., base rim). The anchor hole is traditionally approximately 4.5 mm in diameter, while the spoke diameter is approximately 2 mm. Thus, the operation of attaching a spoke to a rim section requires precision in manipulating the spoke to the anchor hole. The necessity of passing the spoke through the access hole in the skin limits the amount that the spoke can be moved to line it up with the anchor hole in the rim section for the deeper skins of the deeper aerodynamic wheel described herein. Moreover, if the fairing as described herein were fully adhered to the rim section at this stage of assembly, the areas in which the spokes thread into the spoke nipples would be blocked by the fairing and the builder of the deeper wheel would be required to work blind while working with the spoke at the rim section (i.e., when attaching the spoke to the rim and/or when truing the wheel).

With shorter aerodynamic skins/rims, a skilled builder can learn to guide the spoke to the anchor hole, but it should be appreciated that working blind adds considerable complexity. For example, on a prior art wheel having a rim of up to 90 mm depth, approximately ⅔ (or more), or 200 mm or more, of the spoke having approximately 290 mm total length is still exposed on the outside of the rim between the rim nose and the hub. In this situation (a 90 mm or less depth), even when the spoke is constrained by a spoke access hole, having ⅔ or more of the spoke exposed (i.e., outside of the rim) is generally sufficient to manipulate the spoke end to the anchor hole, because a skilled builder can still guide the spoke where it needs to be attached at the rim.

For the deeper aerodynamic wheel described herein, that prior art process is not practical due to the depth of the fairing and the distance from the nose to the base rim. First, when considering a rim having a depth of 120 mm or more, the 290 mm long spoke (which gets attached at the hub first) will only have approximately 170 mm (to as little as approximately 50 mm) of exposed spoke in the open space between the hub and the access hole through the fairing. Thus, for these deeper skin wheels, the spoke must be significantly bent (e.g., often nearly double, or more) to bring the threaded end of the spoke to and through the access hole in the skin. The prior art method of simply approximating a straight line down the exposed part of the spoke to insert the spoke end into the rim hole for that spoke will not work (additionally, the wheel builder is working in a much larger blind area if working with the fairing attached to the rim). Therefore, in order to affix the spokes to the rim section via the nipples for the deeper, the manufacturing technique can include leaving the skin loose (i.e., not adhered or otherwise attached to the rim (or in an alternative embodiment only attached on one side or part of one side)), so that an opening can be created through which the wheel builder can see the spoke after insertion through the skin access hole. By not adhering the skin to the base rim, the wheel builder can see the spoke end and anchor hole after the spoke is fed through the access hole in the skin.

According to one embodiment of a wheel building method, the fairing with spoke access holes is placed over the structural rim assembly (e.g., over a base rim), but the skin and the rim section do not get bonded together. In this way, although the skin can be placed in its approximate final position overlapping the structural rim section, the skin can still be pulled away from the rim section so that the wheel builder can both see inside and grasp the spokes (e.g., with a tool) to line them up to the anchor holes and screw the nipples on without overly twisting the spokes. This innovation provides the advantage of allowing the building of the deeper wheel described herein having skin/rim depths ranging, in some embodiments, from approximately 110 mm to approximately 240 mm deep.

Moreover, it is preferable to hold a spoke relatively close to the spoke nipple (e.g., within 100 mm, and even more preferably within 90 mm of the spoke nipple when attaching or truing a spoke. As will be appreciated, whenever a spoke nipple is rotated to thread onto or tension a spoke, there is a risk that the spoke will wind up (e.g., twist with the rotation of the nipple). This may be caused by galling and binding or by anti-loosing features of the nipples. When a spoke winds up, there is a chance that it will weaken or even break. Generally, the further away the spoke nipple that a spoke is held, the more likely it is to wind up. Holding the spoke (e.g., with a tool) closer to the nipple helps reduce the risk of wind up. In traditional prior assembly methods, the spokes are attached by holding the spoke in place (to prevent/reduce rotation and/or strain on the during attachment at the rim section and/or truing of the wheel) at a point on the spoke that is between the nose and the hub (i.e., outside the rim/skin). In prior art wheels, the spoke could be held at this point (i.e., past the nose towards the hub) due to the lesser depth of the rim. However, if some embodiments of fairings as described herein are fully adhered to the rim section during attachment and truing, it may not be possible to hold the spoke within 90 mm of the spoke nipple.

As another issue, conventional assembly processes use spoke tension gauges to measure spoke tension when tensioning the spokes. Embodiments of the present disclosure, however, may leave an insufficient portion of each spoke exposed to allow the use of a spoke tension gauge. Therefore, different assembly methods may be required.

In contrast to the prior art, the deeper rim design of the deeper bicycle wheel disclosed herein, it may not be desirable to grasp/hold the spoke outside of the rim (e.g., outside of the fairing) during attachment of the spoke to the rim. In the deeper bicycle wheel herein, the distance between the end of the spoke being attached to the rim section and the point at which the spoke can be held outside of the fairing may be too great to allow the spoke to be successfully manipulated without undue strain. Therefore, to attach the spokes to the rim section and true the wheel, for the deeper wheels described herein, a unique manufacturing technique involves leaving the skin loose from the rim section until after the spokes are attached to the rim (in other words, the skin is not adhered to the rim in advance of spoke attachment to the rim) and, in some embodiments, the wheel has been trued. During one method of lacing a bicycle wheel, the spoke gets inserted into the hub first, then passed through the fairing (e.g., through an access opening in the skin designed to accept the specific spoke) and then inserted into the base rim. The fairing may be peeled back to create a work opening to allow the wheel builder to grasp the spoke (e.g., with tools) between the fairing and base rim to both allow the wheel builder to manipulate more easily the spoke to the spoke opening or spoke nipple and to prevent twisting of the spoke during attachment or truing.

Figure 5:
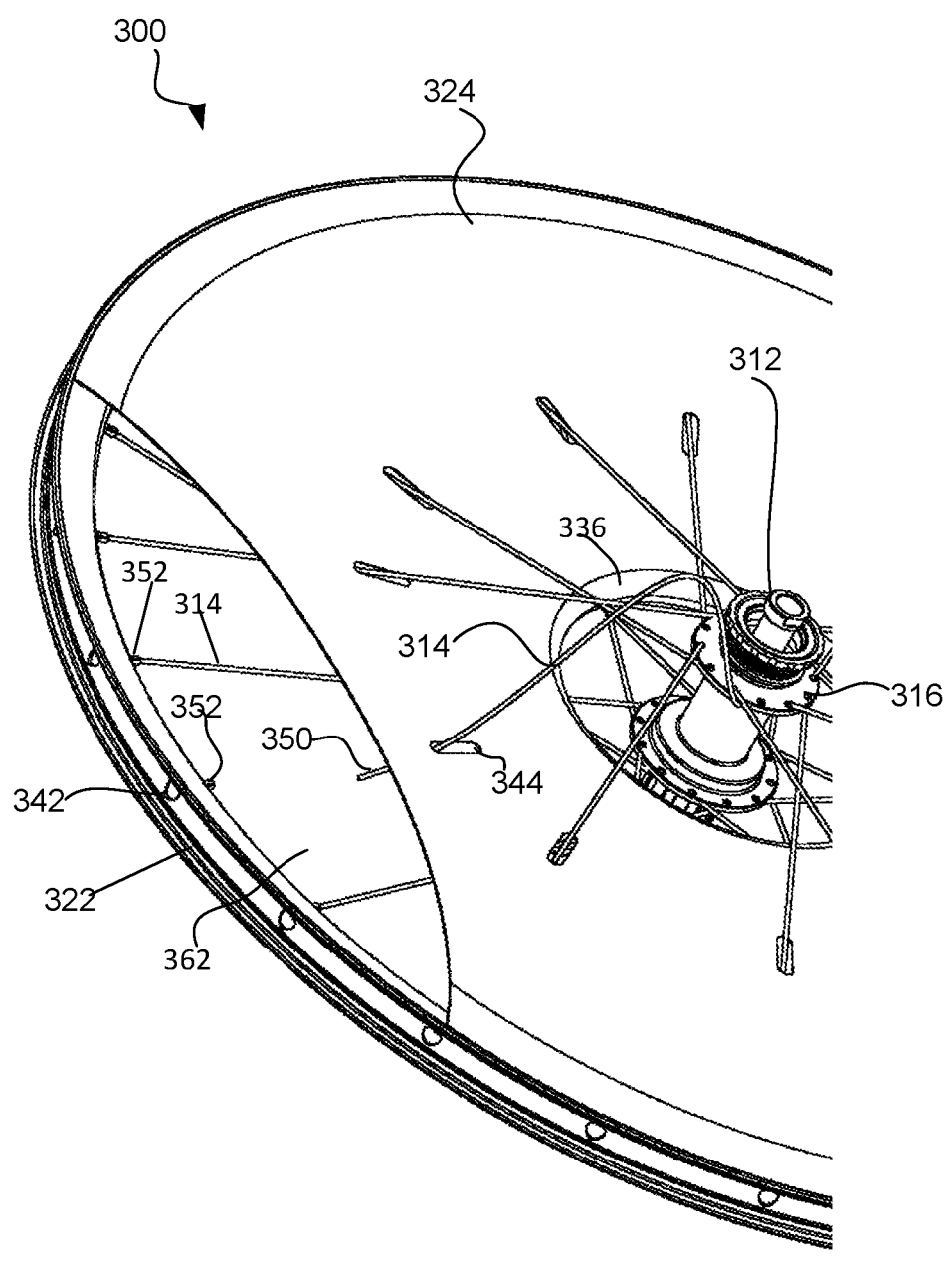
FIG. 5 illustrates an example step in the assembly of one embodiment of a wheel.
Figure 6:
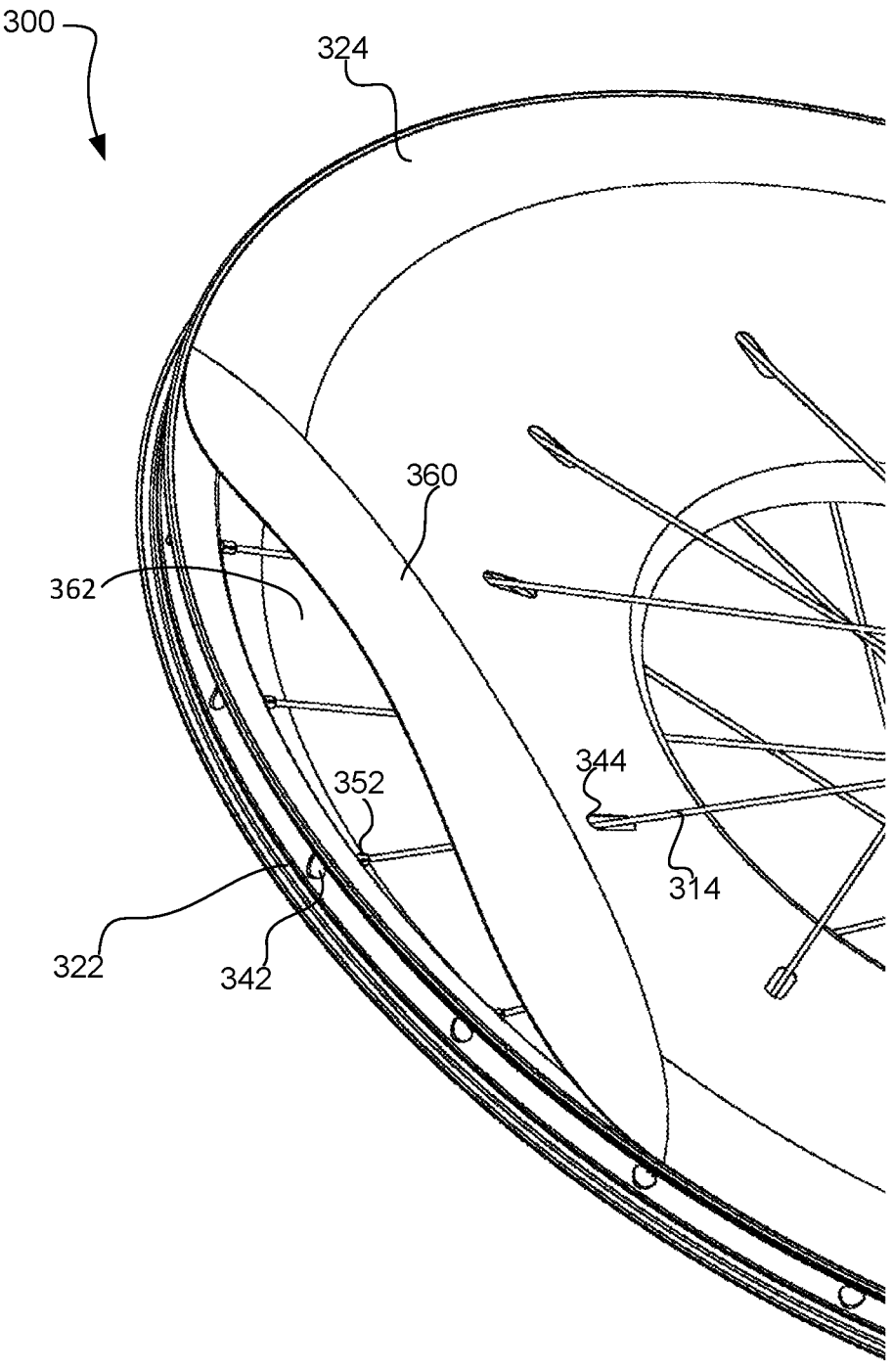
FIG. 6 illustrates another example step in the assembly of one embodiment of a wheel.

One embodiment of assembling a wheel is illustrated using the example of wheel 300. To provide additional context, FIG. 5 illustrates a partially assembled wheel 300 with a portion cut away to better show attachment of spokes 314 to base rim 322. FIG. 6 further illustrates one embodiment of wheel assembly.

According to one embodiment, fairing 324 is positioned relative to base rim 322 in its approximate final position. As discussed above, fairing 324 is formed of a composite material and has an outer portion hand bendable away from the base rim 322. Fairing 324, which extends from an open end 328 to nose 336, defines a pattern of spoke access openings 344 and a central opening, as illustrated in FIG. 1.

Fairing 324 defines a central opening 330. Hub 312 is placed in the central opening, leaving a gap between hub 312 and nose 336. Each spoke is inserted into the hub. Generally, each spoke 314 is inserted into hub flange 316 at one end. Thus, according to one embodiment, the inner end of each spoke 314 is attached to the hub flange 316 (or the hub flange on the other side of the wheel). In one embodiment, the hub end of a spoke 314 has a 90° bend terminating in a head, which helps retain the spoke at the hub. Once inserted into the hub 316, each spoke 314 can rotate in the same plane as the hub flange 316 but, generally, cannot be moved along the length of the spoke.

However, according to embodiments of the present disclosure, the threaded distal end 350 of each spoke 314 (the end distal from hub 312) must pass through a respective access opening 344 in fairing 324 to reach the respective anchor hole and spoke nipple 352 at base rim 322. As such, assembling wheel 300 can include manipulating each spoke to pass the threaded distal end 350 from a first side of the fairing to a second side of the fairing through a respective spoke access opening 344 in fairing 324.

A metal spoke nested at hub flange 316 may have to be bent to weave the distal end 350 between and pass the distal end 350 through the corresponding access hole 344 through fairing 324. Preferably, the bend is at or near the largest radius that allows the spoke 314 to be passed through the access opening 344 to reduce the forces placed on the spoke as it is threaded into the rim section. In any case, the bend should be large enough to prevent permanent deformation of spoke 314. The access holes 344 may be positioned, for example, to limit the amount of bending while still allowing the wheel builder to thread the spoke 314 through the access opening 344 and guide the spoke to the anchor hole or spoke nipple at rim base 322.

To attach a spoke 314 at base rim 322, a spoke nipple 352 can be threaded onto the spoke at base rim 322. Each spoke is attached by turning the respective nipple 352. Alternative methods of attaching the spoke to the rim can also be used with the deeper bicycle wheel described herein.

If fairing 324 were already adhered to base rim 322 when distal end 350 is guided through the corresponding access opening 344, it would be difficult, or potentially not possible, to guide the threaded distal end 350 of the spoke 314 into the anchor hole in base rim 320 so that a nipple 352 can be threaded onto the spoke to attach the spoke at the rim). The bent spoke 314 could not be sufficiently manipulated using only the exposed section of the spoke between hub 312 and the nose 336 of fairing 324 to engage the threaded distal end 350 of the spoke to the nipple 352 in at the respective anchor hole in base rim 322. The wheel builder would be working blind trying to attach the spoke 314 to base rim 322.

Thus, according to one embodiment, fairing 324 remains detached from base rim 322. Moreover, fairing 324 is manufactured to be thin enough to allow the wheel builder to peel the outer portion of fairing 324 away from base rim 322. For example, the wheel builder may peel away a portion of the fairing (e.g., portion 360) to better view the spoke 314 as it passes through access opening 344 or while attaching the spoke 314 to base rim 322. To facilitate bending fairing 324 away from base rim 322 to allow the user to access the spoke nipple 352, fairing 324 may be relatively thin in the outer section. By way of example, but not limitation, fairing 324 may be a carbon fiber fairing that is approximately 0.5 mm thick near the outer edge of the fairing. Fairing 324 can become thicker further away from the outer edge. For example, in one embodiment, fairing 324 is about 1.4 mm at the nose section. The outer portion of fairing 324 may be hand bendable away from base rim 322.

Thus, fairing 324—that is, the composite skin—can be pulled back from the face of base rim 322 to create a work opening 362 through which the spoke 314 is accessed (e.g., with a tool or by hand). The spoke 314 can then be accessed through work opening 362, grasped using a tool, guided to the appropriate anchor hole or nipple, and held in place while the spoke gets attached to the rim section (e.g., while the respective nipple 352 is threaded on). In this way, the spoke 314 can be held/grasped and prevented from moving or twisting during attachment to base rim 322. More particularly, the spoke 314 can be held/grasped at a location on the spoke that is significantly closer to the base rim 322 than if the spoke was only held outside the fairing. For example, the spoke can be held at approximately 20-70 mm from base rim 322, rather than at a location on the spoke that is a significant distance (e.g., greater than 90 mm) from base rim 322). Furthermore, the peeling back of the fairing 324 allows the wheel builder to see the rim spoke access hole at base rim 322, thereby making the attachment of the spoke 314 to base rim 322 significantly easier and more efficient. Thus, the new manufacturing technique described herein does away with or reduces the need to grasp/hold the spoke at a distance that is significantly further away from the rim section (thereby reducing the adverse forces, strains, etc. that get applied to the spoke) during attachment, while at the same time providing the builder the ability to see the attachment point of the spoke at the rim section.

As will be appreciated, leaving the fairing 324 unattached and allowing the fairing to be pulled away from base rim 322 can also help in truing. During truing, the spokes 314 are tensioned, typically by manipulating the spoke nipples. For example, the spoke can be held at a point along the spoke that is close to the nipple to prevent or reduce twisting of the spoke.

Thus, one embodiment of wheel assembly can include leaving the fairing 324 loose (e.g., not secured in place at base rim 322) until after the spokes are attached to the rim section (e.g., using spoke nipples) and after the wheel has been trued, or alternatively, only attaching one side (or part of one or both sides) of fairing 324 to the outer face of base rim 322 until the spokes have been attached at the rim (e.g., using spoke nipples) and after the wheel has been trued.

As discussed, attaching spoke 314 to base rim 322 and truing wheel 300 can include threading a spoke nipple 352, disposed through anchor opening 342 in base rim 322, onto the threaded distal end 350 of spoke 314. Spoke 314 is tightened by turning the nipple 352 onto spoke 314 until a desired tension is reached. The wheel builder can access the outer end 350 of spoke 314 and nipple 352 via the opening formed by peeling away the fairing from base rim 322. Further, the wheel builder can hold the spoke relatively close to the nipple as they tension the spoke.

Various methods can be used to tighten spoke 314 to a proper tension. In some cases, the exposed length of spoke 314 is too short to use a traditional spoke tension gauge. According to one embodiment, a reference wheel using the same type of base rim 322, hub 312, and spokes is assembled, but without fairing 324. As the spoke nipples of the reference wheel are threaded onto the spokes, the spoke tensions are recorded using a spoke tension gauge. The number of turns of the spoke nipples and the corresponding tensions are recorded and correlated. When assembling wheel 300, the assembler can count the number of turns of spoke nipple 352 on spoke 314 and use the number of turns as a proxy for tension.

According to one embodiment, all the spokes 314 are inserted in the hub 312, then the individual spokes 314 are attached to base rim 322 until they are all attached to the anchor holes in the base rim 322 in the correct place and pattern. The wheel can then be trued by tensioning the spokes 314 to a specified tension, while gauging the lateral and vertical runout of the wheel to ensure that it is true. According to one embodiment, fairing 324 is bonded to base rim 322 after the wheel is trued.

The steps described above can be performed in various orders. For example, all the spokes can be nested before any spoke is attached to the base rim. In other embodiments, each spoke is nested and trued before moving to the next spoke and so on. One side of the fairing can be attached to base rim 322 before any spokes have been nested and trued or once all the spokes on that side of the wheel have been nested and trued. In another embodiment, neither side of the fairing is connected to base rim 322 until all the spokes have been nested and trued.

While embodiments of the present disclosure have been discussed using the example of ISO 622 mm wheels (e.g., 700c), embodiments of other wheels (e.g., 650c) may use deep aerodynamic rims according to the present disclosure. Further, alternative methods of attaching the spoke to the rim can also be used with the deep bicycle wheels described herein.

In the embodiments discussed above, the spokes are attached to the base rim. In an alternative embodiment, the deeper aerodynamic wheel described herein can use an all-carbon skin/rim, where the spokes are attached at the nose end of the rim/skin. While prior art wheels with all carbon rims exist, the deeper aerodynamic wheel described herein has a much deeper profile than any of these prior art wheels and can utilize significantly reduced length spokes (since the spokes are attached at the hub and the nose of the rim/skin), while also having a much-reduced open space ("donut hole") at the center of the wheel. This enables an aerodynamically superior wheel as compared to prior art wheels. In such an embodiment, manufacturing techniques involve attaching the spoke at a point significantly further away from the tire bed than in the prior art (e.g., attaching a nipple by sending it through the tire bed at a distance of, for example, approximately 180 mm (for a 180 mm deep rim version), and manipulating the nipple to attach it to the spoke using a longer tool than utilized in the prior art. Furthermore, the material and manufacturing choices for such an embodiment should reflect the additional carbon required and the fact that the carbon nose must bear the stresses associated with the spokes (e.g., attaching, truing and during riding of the wheel).

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Summary and Abstract) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for building a deep aerodynamic wheel, the method comprising:

providing a base rim, the base rim having a plurality of anchor holes;

positioning a fairing relative to the base rim, the fairing formed of a composite material and having an outer portion that is hand-bendable away from the base rim, the fairing defining a pattern of spoke access openings, the fairing extending from an open end to a nose and defining a central opening;

positioning a hub in the central opening with a gap between the hub and the nose of the fairing;

inserting a plurality of spokes into the hub;

for each of the plurality of spokes;
    feeding the spoke from a first side of the fairing to a
      second side of the fairing through a respective spoke
      access opening in the fairing;
    pulling the fairing back from the base rim to provide a
      work opening;
    manipulating the spoke from the second side of the
      fairing via the work opening to guide the spoke to a
      respective anchor opening in the base rim; and
    attaching the spoke to the base rim using a respective
      spoke nipple; and
  bonding the outer portion of the fairing to the base rim to
    create a deep aerodynamic rim, the deep aerodynamic
    rim having a rim depth of at least 110 mm.

2. The method of claim 1, wherein attaching the spoke to the base rim using the respective spoke nipple comprises holding the spoke within 90 mm of the respective spoke nipple as the respective spoke nipple is threaded onto the spoke, wherein the spoke is accessed via the work opening.

3. The method of claim 2, wherein the spoke is grasped at a location that is 20 mm to 70 mm from the respective spoke nipple as the respective spoke nipple is threaded onto the spoke.

4. The method of claim 1, further comprising truing the deep aerodynamic wheel, wherein truing the deep aerodynamic wheel comprises, for each of the plurality of spokes:
    manipulating the respective spoke nipple to increase
      tension in the spoke to reach a desired tension, wherein
      the spoke is accessed via the work opening and held
      within 90 mm of the respective spoke nipple to resist
      twist in the spoke.

5. The method of claim 4, wherein the spoke is grasped at a location that is 20 mm to 70 mm from the respective spoke nipple as the respective spoke nipple is threaded onto the spoke.

6. The method of claim 4, further comprising attaching the fairing to the base rim after truing the deep aerodynamic wheel.

7. The method of claim 1, further comprising, for each of the plurality of spokes, bending the spoke to guide the spoke through the respective spoke access opening.

8. The method of claim 7, wherein the outer portion of the fairing has a first thickness, and wherein the nose has a second thickness that is greater than the first thickness.

9. The method of claim 1, wherein the deep aerodynamic wheel is a 700c wheel and the rim depth is 110 mm to 240 mm.

10. The method of claim 1, wherein the fairing is a carbon fiber fairing.

11. The method of claim 1, further comprising, for each of the plurality of spokes, turning the respective spoke nipple a known number of turns to achieve a correlated tension.

12. The method of claim 1, wherein the fairing is formed as a single piece construction.

13. The method of claim 1, wherein the fairing is symmetrical about a centerline.

14. The method of claim 1, wherein the plurality of spokes are metal spokes.

15. The method of claim 1, wherein the plurality of spokes are polymer spokes.

16. The method of claim 1, further comprising bonding one side of the fairing to the base rim prior to attaching the plurality of spokes to the base rim.

\* \* \* \* \*